(12) United States Patent
Oglesby et al.

(10) Patent No.: US 6,628,006 B2
(45) Date of Patent: Sep. 30, 2003

(54) SYSTEM AND METHOD FOR RECOVERING POTENTIAL ENERGY OF A HYDROGEN GAS FUEL SUPPLY FOR USE IN A VEHICLE

(75) Inventors: Keith Andrew Oglesby, Livonia, MI (US); Kurt David Osborne, Dearborn, MI (US); Woong-chul Yang, Ann Arbor, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 09/848,698

(22) Filed: May 3, 2001

(65) Prior Publication Data

US 2002/0163200 A1 Nov. 7, 2002

(51) Int. Cl.[7] .............................. H02P 9/04; H02P 9/00; F01D 15/10; F02C 6/00; H02K 7/18
(52) U.S. Cl. .......................................... 290/52; 290/1 R
(58) Field of Search ............................... 429/12, 23, 25, 429/34, 30, 13, 17; 290/52, 1 R; 180/54.1, 65.3; 60/39, 39.183; 204/270, 242; 363/98; 701/22

(56) References Cited

U.S. PATENT DOCUMENTS

| 4,281,256 A | * | 7/1981 | Ahrens et al. ............... 290/1 R |
| 5,417,051 A | * | 5/1995 | Ankersmit et al. ........... 429/17 |
| 5,811,201 A | * | 9/1998 | Skowronski ................ 204/269 |
| 5,991,670 A | * | 11/1999 | Mufford et al. ............ 180/65.1 |
| 6,024,859 A | * | 2/2000 | Hsu ........................... 138/148 |
| 6,054,838 A | * | 4/2000 | Tsatsis ........................ 180/165 |
| 6,058,736 A | * | 5/2000 | Keenan ........................ 62/648 |
| 6,338,912 B1 | * | 1/2002 | Ban et al. ..................... 429/12 |
| 6,365,289 B1 | * | 4/2002 | Lee et al. ..................... 429/13 |
| 6,370,050 B1 | * | 4/2002 | Peng et al. .................... 363/17 |

* cited by examiner

Primary Examiner—Nestor Ramirez
Assistant Examiner—Julio C. Gonzalez
(74) Attorney, Agent, or Firm—Ford Global Technologies, LLC

(57) ABSTRACT

A system 10 is provided for recovering the potential energy of a hydrogen gas fuel supply within a fuel cell powered vehicle 14. The system 10 includes a conventional storage tank 16 which receives and stores hydrogen gas at a relatively high pressure, an expander 18, a compressor 20, a motor/generator 76 which selectively generates electrical power and torque, pressure regulators 22, 24, a valve 26, an electrical charge storage device or battery 28, a controller 30, vehicle sensors 32 and electrical switches or switching module 34. The system 10 selectively channels pressurized hydrogen gas through expander 18 which lowers the pressure of the hydrogen gas, rotatably drives compressor 20 and generates electricity. Controller 30 causes the generated electricity to be selectively communicated to electrical accessories 72, and/or to battery 28 by use of switching module 34, based upon vehicle attribute data received from sensors 32. Based upon the attribute data, controller 30 may also signal valve 26 to bypass expander 18, and cause electrical power to be supplied to motor/generator 76 from battery 28 to drive compressor 20.

20 Claims, 1 Drawing Sheet

SYSTEM AND METHOD FOR RECOVERING POTENTIAL ENERGY OF A HYDROGEN GAS FUEL SUPPLY FOR USE IN A VEHICLE

FIELD OF THE INVENTION

This invention relates to a system and a method for recovering potential energy of a hydrogen gas fuel supply in a vehicle and more particularly, to a system and method which uses an expander, compressor and a motor/generator to utilize the potential energy stored within hydrogen gas that is supplied to a fuel cell in order to provide pressurized air to the fuel cell and to generate electricity, thereby improving the efficiency and the fuel economy of the vehicle.

BACKGROUND OF THE INVENTION

In order to reduce automotive emissions and the demand for fossil fuel, automotive vehicles have been designed that are powered by electrical devices such as fuel cells. These fuel cell-powered electric vehicles reduce emissions and the demand for conventional fossil fuels by eliminating the internal combustion engine (e.g., in completely electric vehicles) or by operating the engine at only its most efficient/preferred operating points (e.g., within hybrid electric vehicles).

Many fuel cells consume hydrogen gas and air (e.g., as a reaction constituent). The consumed hydrogen and air must be properly stored and transferred to the fuel cell at certain pressures in order to allow the fuel cell and vehicle to operate in an efficient manner.

Vehicles employing these types of fuel cells often include systems and/or assemblies for storing and transmitting hydrogen gas and air to the fuel cell. Particularly, the hydrogen gas is typically stored within a tank at a relatively high pressure and with a relatively high amount of potential energy. The hydrogen gas is then transferred to the fuel cell by use of several conduits and several pressure-reducing regulators which lower the pressure of the gas by a desirable amount. While the pressure of the hydrogen gas leaving the fuel tank is substantially lowered prior to entering the fuel cell, it is above normal atmospheric pressures which is required for efficient operation. The air that is communicated from the fuel cell is obtained at atmospheric pressures and must be pressurized or otherwise driven through the system in order to ensure proper and efficient fuel cell operation. This pressurization and/or driving of air through the system is typically performed by use of one or more compressors or turbines. These compressors or turbines require electrical energy for their operation, and therefore drain the vehicle's battery and use generated electrical energy, which could otherwise be used to power the vehicle's electrical components and accessories.

There is therefore a need for a new and improved system and method for use with a fuel cell powered vehicle which recovers the potential energy stored within pressurized hydrogen gas and which converts that potential energy to mechanical and electrical energy that can be used to drive a compressor, to supplement the electrical power demands of the vehicle and/or to recharge an electrical storage device.

SUMMARY OF THE INVENTION

A first non-limiting advantage of the invention is that it provides a system and method for recovering the potential energy of the compressed gas stored within a fuel cell-powered vehicle.

A second non-limiting advantage of the invention is that it provides a system and method for recovering the potential energy of the hydrogen gas stored within a fuel cell powered vehicle and which selectively converts the potential energy into mechanical and electrical energy which is selectively used to drive a compressor, supplement the electrical power demands of the vehicle, and/or to recharge an electrical storage device.

According to a first aspect of the present invention, a system is provided for recovering potential energy from a hydrogen gas fuel supply that is used to power a fuel cell within a vehicle. The system includes a fuel tank which stores pressurized gas; a first conduit system which selectively and fluidly couples the fuel tank to the fuel cell, effective to allow the pressurized gas to be selectively communicated to the fuel cell; an expander including a turbine which is disposed within the first conduit system and which is selectively and rotatably driven by the pressurized gas, effective to generate torque and lower the pressure of the pressurized gas which is communicated to the fuel cell; a second conduit system which selectively and fluidly couples the fuel cell to a source of air, effective to allow the air to be selectively communicated to the fuel cell; a compressor which is disposed within the second conduit system and which is selectively coupled to and driven by the expander, the compressor being effective to pressurize the air which is communicated to the fuel cell; and an electric machine which is operatively coupled to the expander and the compressor, the electric machine being effective to selectively convert torque generated by the expander into electrical power, and to selectively convert electrical power into mechanical torque for rotating the compressor.

According to a second aspect of the present invention, a method is provided for recovering potential energy stored within a pressurized gas used to power a fuel cell within a vehicle. The method includes the steps of: providing a first conduit system for transferring the pressurized gas to the fuel cell; providing an expander; operatively disposing the expander within the first conduit system; providing a motor/generator for producing electrical power from torque and for producing torque from electrical power; providing a second conduit system for transferring air to the fuel cell; providing a compressor; operatively disposing the compressor within second conduit system; operatively connecting the expander and the compressor to the motor/generator; selectively connecting the expander and the compressor; and channeling the pressurized gas through the expander, effective to rotatably drive the expander, thereby selectively driving the compressor and selectively causing the motor/generator to produce electrical power.

These and other features, aspects, and advantages of the invention will become apparent by reading the following specification and by reference to the following drawings.

DETAILED DESCRIPTION OF THE PREFERRED EMBODIMENT OF THE INVENTION

Figure 1:
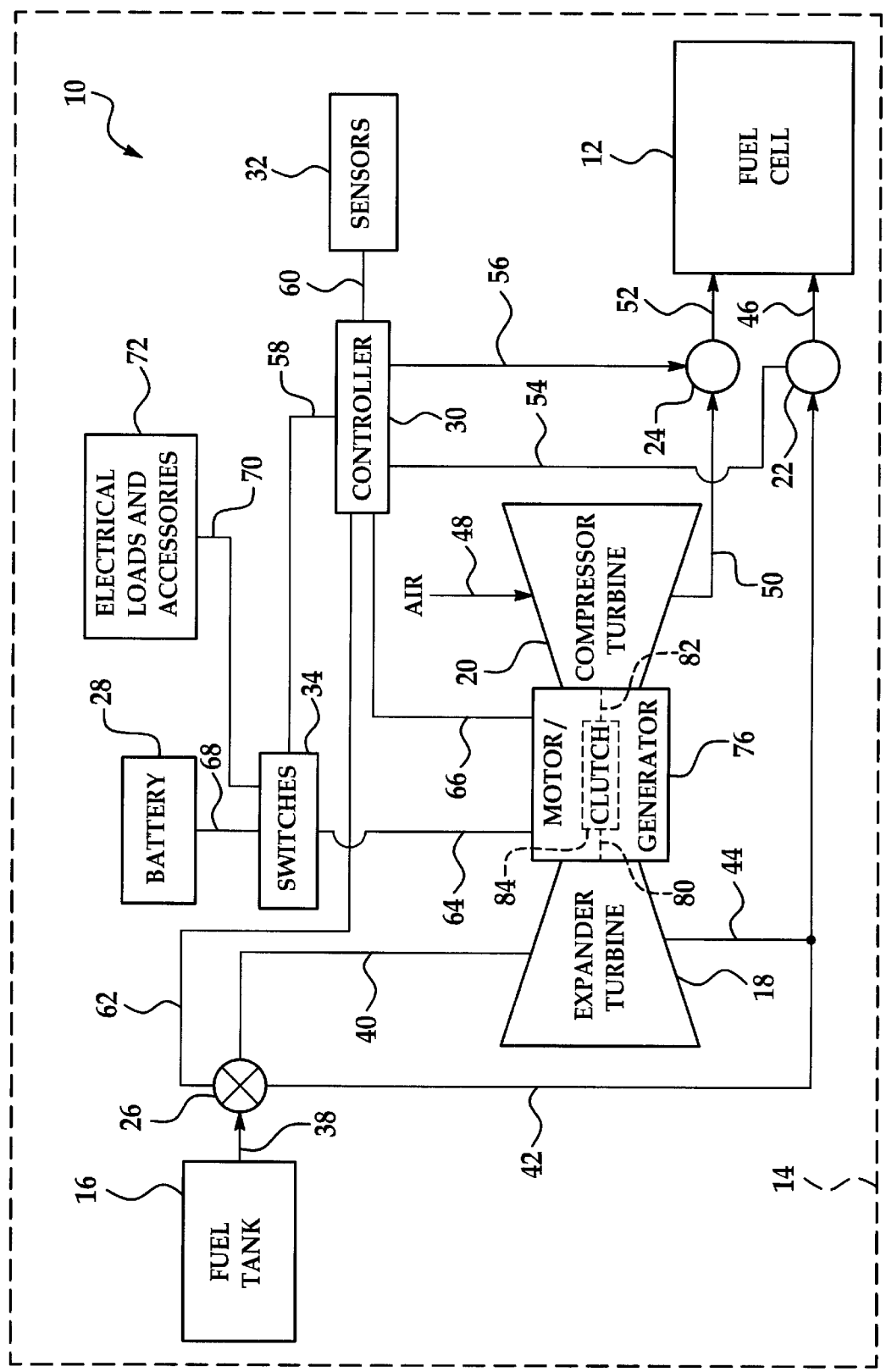
FIG. 1 is a block diagram of a system which is made in accordance with the teachings of the preferred embodiment of the invention, which is adapted for use with a fuel cell powered vehicle and which is effective to recover the potential energy stored within hydrogen gas that is used to power the vehicle's fuel cell.

Referring now to FIG. 1, there is shown a block diagram of a system 10, which is made in accordance with the teachings of the preferred embodiment of the invention, and which is effective to recover the potential energy which is stored within the hydrogen gas which is supplied to one or more fuel cells 12 within a vehicle 14. Particularly, system 10 is adapted for use in combination with a vehicle 14 including one or more hydrogen-based fuel cells 12 which provide power to the vehicle 14. In the preferred embodiment, vehicle 14 is an electric or a hybrid-electric vehicle. In the preferred embodiment, fuel cells 12 utilize a chemical reaction that consumes hydrogen gas to generate electrical power. It should be appreciated that while in the preferred embodiment of the invention, fuel cells 12 are of the type which consume hydrogen gas, in other alternate embodiments, other types of compressed gasses can be used to generate power within the fuel cell 12, and system 10 would work in a substantially identical manner to recover potential energy stored within those compressed gasses and provide substantially identical benefits.

System 10 includes a conventional storage tank 16 which receives and stores hydrogen gas at a relatively high pressure, an expander turbine 18 and a compressor turbine 20 which are each coupled to an electric machine or motor/generator 76, pressure regulators 22, 24, a bypass valve 26, an electrical charge storage device or battery 28, a controller 30, vehicle sensors 32 and electrical switches or switching module 34.

The system 10 further includes a first conduit system having several tubes or conduits that are disposed throughout the vehicle 14 and that selectively carry and transport the hydrogen gas from the tank 16 to the fuel cell 12. Particularly, fuel tank 16 is fluidly coupled to valve 26 by use of conduit 38, and valve 26 is fluidly coupled to expander turbine 18 by use of conduit 40 and to regulator 22 by conduit 42. Expander turbine 18 is fluidly coupled to conduit 42 and to regulator 22 by use of conduit 44, and regulator 22 is fluidly coupled to fuel cell 12 by conduit 46.

A second conduit system fluidly couples fuel cell 12 to a source of air. Particularly, compressor turbine 20 is fluidly coupled to and receives air through conduit 48, and is further fluidly coupled to regulator 24 by use of conduit 50. Regulator 24 is fluidly coupled to fuel cell 12 by use of conduit 52. It should be appreciated that the present invention is not limited to the foregoing conduit systems or configurations, and that in alternate embodiments, different and/or additional numbers of conduits may be used to interconnect the various components of system 10. For example and without limitation, vehicle 14 may further include exhaust and/or return conduit systems (not shown) which are effective to treat and/or remove exhaust gasses from the vehicle 14 and/or to return unused hydrogen gas to the fuel cell 12.

Controller 30 is respectively, electrically and communicatively coupled to regulators 22, 24 by use of electrical buses 54, 56, to switching module 34 by use of electrical bus 58, to sensors 32 by use of electrical bus 60, to valve 26 by use of electrical bus 62, and to motor/generator 76 by use of bus 66. Switching module 34 is further respectively, electrically and communicatively coupled to motor/generator 76 by use of power bus 64, to battery 28 by use of power bus 68, and to vehicle electrical loads and accessories 72 by use of power bus 70.

In the preferred embodiment, controller 30 is a conventional microprocessor based controller and in one non-limiting embodiment, controller 30 comprises a portion of a conventional engine control unit ("ECU"). In other alternate embodiments, controller 30 is externally coupled to the engine control unit.

Fuel tank 16 is a conventional storage tank which is adapted to receive and store compressed gaseous fuel, such as hydrogen gas, at relatively high pressures. In the preferred embodiment, expander 18 is a conventional turbine which selectively receives and which is rotatably driven by pressurized gas delivered from tank 16. Expander turbine 18 is selectively and operatively coupled to motor/generator 76 by use of shaft 80 and to compressor turbine 20 by use of shaft 80, a conventional clutch 84 and a shaft 82 which is coupled to compressor turbine 20. In one alternate embodiment, expander turbine 18 and compressor turbine 20 are connected by a single shaft. When expander turbine 18 and compressor turbine 20 are mechanically coupled together by use of clutch 84, the rotation or torque produced by expander turbine 18 drives compressor turbine 20. This rotation/torque can also be selectively used by the motor/generator to generate electrical energy in a conventional manner. After passing through expander turbine 18, the hydrogen gas is communicated to fuel cell 12 by way of conduits 44, 42, 46 and regulator 22.

In the preferred embodiment, compressor turbine 20 is selectively coupled to and rotatably driven by motor/generator 76 and expander turbine 18. Turbine 20 is in fluid communication with conduit 48 and is effective to "draw in" air through conduit 48 (e.g., from the environment external to the vehicle), to compress or pressurize the air and to communicate the pressurized air to fuel cell 12 by use of conduits 50, 52 and regulator 24.

Motor/generator 76 is a conventional electric machine which is capable of both generating electrical power from mechanical torque, and generating torque from electrical power. Particularly, motor/generator 76 is capable of operating in an "electrical power-generating mode" in which the motor/generator 76 receives torque from the rotating expander turbine 18 and converts some of that torque into electrical power (the remainder of the torque is used to drive compressor 20). Motor/generator 76 is also capable of operating in a "torque-producing mode" in which motor/generator 76 receives electrical power (e.g., from battery 28) and converts the electrical power into torque for rotating compressor turbine 20. In the preferred embodiment, motor/generator 76 disconnects compressor 20 from expander 18 (e.g., by deactivating clutch 84) during torque-producing operation and delivers torque only to compressor 20, thereby reducing the amount of torque and electrical power required to drive compressor 20.

In the preferred embodiment, regulators 22, 24 are conventional electronically controlled pressure regulators which respectively control the pressure of hydrogen gas and air which entering into fuel cell 12. Particularly, regulators 22 and 24 receive signals from controller 30 which are effective to control the operation of regulators 22, 24. Controller 30 controls the amount that the regulators 22, 24 decrease the pressure of gas and air entering into fuel cell 12 based upon vehicle operating data that is received from conventional vehicle operating sensors 32. In alternate embodiments, regulators 22, 24 are mechanically controlled or set regulators.

Sensors 32 comprise conventional and commercially available vehicle operating sensors which measure and/or estimate various vehicle operating attributes, such as the pressure of the hydrogen gas and air within various locations in the system (i.e., within various conduits), the vehicle speed, the torque provided by turbine 18 to motor/generator 76, the engine speed, the amount of fuel remaining in tank 16, the pressure of the fuel within tank 16, and/or the state of charge of battery 28. Sensors 32 measure and/or estimate these attributes and communicate signals representing the measured and/or estimated values to controller 30 which uses the signals to operate electrical switches 34, regulators 22, 24, motor/generator 76 and bypass valve 26 in a desired manner.

Bypass valve 26 is a conventional electronically controlled (e.g., solenoid) valve which allows pressurized gas from fuel tank 16 to be selectively communicated to expander turbine 18 through conduit 40 or to be selectively communicated directly to regulator 22 through conduit 42. Valve 26 may also be selectively disposed in a closed position in which no gas is allowed to escape from tank 16 through either of conduits 40 or 42.

Electrical switches or switching module 34 includes several conventional electrical switches (e.g., transistors and/or relays) which operate in response to signals received from controller 30 and which allow motor/generator 76 to be selectively and operatively connected to electrical components and accessories 72 and to battery 28. In one non-limiting embodiment, switching module 34 may be integral with controller 30. In another alternate embodiment, switching module 34 may comprise several disparate switches or devices which are each independently connected to controller 30 and which individually receive command signals from controller 30.

In operation, system 10 utilizes the potential energy stored within the hydrogen gas fuel to generate torque and electrical power. Particularly, when the tank 16 is filled, the hydrogen gas is at a relatively high pressure. When the vehicle 14 is operated, the pressure of the hydrogen gas must be substantially reduced prior to being transferred to fuel cell 12. When the tank 16 is substantially filled, this pressure reduction is performed by channeling the pressurized gas through expander turbine 18. Particularly, controller 30 sends a signal to valve 26, effective to cause valve 26 to channel the gas through conduit 40. When the pressurized gas flows through expander 18, it is effective to both desirably reduce the pressure of the gas and to generate torque and rotatably drive expander 18, thereby driving compressor 20 and generating power within motor/generator 76. In this manner, the potential energy stored within the compressed gas is desirably captured and converted into mechanical and electrical energy. Based upon vehicle attribute or operating data received from sensors 32, controller 30 sends signals to motor/generator 76, effective to control the amount of electrical energy generated by the motor/generator 76. For example and without limitation, when tank 16 is substantially filled, motor/generator 76 is allowed to operate with a relatively high electrical power output. As the pressure of the hydrogen gas within tank 16 and conduits 38, 40 begins to decrease, a higher percentage of the torque generated by expander 18 is used to rotatably drive compressor 20 in order to maintain a desired air pressure value within conduits 50 and 52 (e.g., less torque is converted into electrical power).

Controller 30 also controls switches 34, in order to direct the generated power to electrical components and accessories 72, effective to provide electrical power to one or more conventional vehicle electrical loads or accessories 72 and/or to battery 28, effective to recharge the battery 28. Controller 30 determines where to direct the generated electrical power based upon the amount or level of power being generated, and the power requirements or needs of the various components 72 and the state of charge of battery 28. The priority and/or sequence in which the various components 72 and battery 28 receive power may be selectively programmed into controller 30 and may be based upon any desirable design considerations. Controller 30 will also source electrical power directly from the battery 28 to the motor/generator 76 in the event that sufficient torque is not being received from the expander 18 to drive compressor 20 at a certain desired level.

After the compressed hydrogen gas passes through expander 18, it traverses conduits 44 and 42 and enters "low pressure" pressure-reducing regulator 22 which lowers the pressure of the gas to a predetermined and/or calibratable level which is necessary for the optimal performance of fuel cell 12 and which may be determined based upon the attributes of fuel cell 12. In the preferred embodiment, controller 30 selectively alters the amount that pressure-reducing regulator 22 lowers the pressure of the hydrogen gas, based upon vehicle attribute or operation condition data, and based upon the pressure of the gas after it traverses expander turbine 18, which can be sensed in a conventional manner (e.g., by use of conventional pressure sensors (not shown)).

Controller 30 further controls the operation of "low pressure" pressure-reducing regulator 24 which ensures that the pressure of the compressed air entering fuel cell 12 is equal to a predetermined value which is necessary for optimal performance of fuel cell 12.

As the vehicle 14 is driven and the fuel supply is depleted, the pressure of the hydrogen gas within the system decreases. Controller 30 monitors this pressure by use of sensors 32 and when the pressure falls below a certain predetermined and/or calibratable level, controller 30 generates a signal to valve 26 effective to cause the hydrogen gas from tank 16 to bypass expander 18 and to flow directly to pressure-reducing regulator 22 through conduit 42. System 10 performs this "bypass" function to ensure that pressure of the hydrogen gas entering fuel cell 12 is sufficient for optimal performance of the fuel cell 12. That is, when the pressure of the gas in tank 16 falls below a certain level, the pressure drop over the expander turbine 18 may cause the pressure of the hydrogen gas to fall below a value which is required for optimal performance of the fuel cell 12. In these situations expander 18 is bypassed and pressure-reducing regulator 22 is accordingly adjusted to provide the desired pressure decrease. Additionally, during these "bypass" operating modes, controller 30 communicates signals to switches 34 and motor/generator 76, effective to source electrical power from battery 28 to motor/generator 76 and to cause motor/generator 76 to operate in a torque-producing mode (e.g., as a motor), thereby driving compressor 20 at a desired level. In the preferred embodiment, controller 30 also signals motor/generator 76 to deactivate clutch 84, effective to disconnect compressor 20 from expander 18, thereby allowing all of the motor-generated torque to be used to drive compressor 20.

In this manner, system 10 efficiently utilizes and recovers the potential energy stored within the compressed hydrogen gas by use of expander turbine 18 and motor/generator 76. This potential energy is selectively converted into mechanical torque and electrical power which is used to drive compressor 20 and to selectively power various components and/or to recharge the vehicle's battery 28. System 10 further eliminates the need for a "high-pressure" pressure-reducing regulator, by desirably lowering the pressure of the hydrogen gas by a substantial amount (e.g., by at least a factor of 10) prior to the gas passing through low pressure step-down regulator 22 and into fuel cell 12. System 10 also provides the flexibility to bypass the expander 18 in certain situations, thereby substantially guaranteeing that the gas entering fuel cell 12 will be of a sufficient pressure for optimal performance.

It is to be understood that the invention is not to be limited to the exact construction and/or method which has been illustrated and discussed above, but that various changes and/or modifications may be made without departing from the spirit and the scope of the invention.

What is claimed is:

1. A system for recovering potential energy from a pressurized gas fuel supply which is used to power a fuel cell within a vehicle, said system comprising:

a fuel tank for storing pressurized gas fuel;

a first conduit system for selectively and fluidly coupling said fuel tank to the fuel cell, and for allowing the pressurized gas fuel to be selectively communicated to the fuel cell;

an expander disposed within said first conduit system and which is selectively driven by the pressurized gas fuel, for generating torque and lowering the pressure of the pressurized gas fuel which is communicated to the fuel cell;

a second conduit system for selectively and fluidly coupling the fuel cell to a source of air, and for allowing the air to be selectively communicated to the fuel cell;

a compressor disposed within said second conduit system and which is selectively coupled to and driven by said expander, for pressurizing the air which is communicated to fuel cell; and an electric machine operatively coupled to said expander and to said compressor, for selectively converting torque generated by said expander into electrical power, and for selectively converting electrical power to drive said compressor.

2. The system according to claim 1, further comprising an electrical power source selectively coupled to said electric machine.

3. The system according to claim 1, further comprising a bypass valve for causing the pressurized gas fuel to selectively bypass said expander.

4. The system according to claim 3, further comprising:

at least one sensor for measuring at least one vehicle operating attribute and for generating a signal representing the measured vehicle operating attribute; and a controller coupled to said bypass valve and to said at least one sensor, for receiving the signal and for selectively controlling the bypass valve based upon the value of the signal.

5. The system according to claim 4, further comprising a switching module coupled to said controller and a plurality of electrical components, said switching module being selectively controlled by said controller to selectively transfer the generated power from the electric machine to one or more of said plurality of electrical components.

6. The system according to claim 5, wherein said controller selectively and electrically connects said electric machine to said electrical power source by use of said switching module.

7. The system according to claim 1, further comprising at least one pressure-reducing regulator disposed within said first conduit system.

8. A system for supplying pressurized hydrogen gas and air to a fuel cell within a vehicle, said system comprising:

a fuel tank for storing the pressurized hydrogen gas;

a first conduit system for selectively and fluidly coupling said fuel tank to the fuel cell, and for allowing the pressurized hydrogen gas to be selectively communicated to said fuel cell;

a motor/generator for selectively converting torque into electrical power, and for selectively converting electrical power into mechanical torque;

a source of electrical power selectively connected to said motor/generator for selectively providing electrical power to said motor/generator;

an expander disposed within said first conduit system, and operatively coupled to said motor/generator, and which is selectively and rotatably driven by the pressurized hydrogen gas, for lowering the pressure of the pressurized hydrogen gas communicated to the fuel cell and for causing said motor/generator to produce electrical power;

a second conduit system for fluidly coupling the fuel cell to a source of air, and for allowing the air to be selectively communicated to the fuel cell;

a compressor disposed within said second conduit system, and operatively coupled to said motor/generator, and which is selectively and operatively coupled to said expander, said compressor being selectively and rotatably driven by said expander and by said motor/generator, for pressurizing said air within said second conduit system; and a clutch for selectively connecting and disconnecting said expander and said compressor.

9. The system according to claim 8, further comprising:

a bypass valve disposed within said first conduit system for causing the pressurized hydrogen gas to selectively bypass said expander; and a controller connected to said bypass valve for selectively actuating said bypass valve, and for causing the pressurized hydrogen gas to selectively bypass said expander.

10. The system according to claim 9, wherein said controller is further connected to said motor/generator for causing said motor/generator to drive said compressor when the pressurized hydrogen gas bypasses said expander.

11. The system according to claim 10, further comprising:

a plurality of sensors for measuring vehicle operating attributes and for generating signals representing said measured vehicle operating attributes; and wherein said controller is coupled to said plurality of sensors, and wherein said controller receives said signals and selectively actuates said bypass valve based upon the value of said signals.

12. The system according to claim 8, wherein said compressor comprises a turbine.

13. The system according to claim 8, wherein said expander comprises a turbine.

14. A method for recovering potential energy stored within a pressurized gas used to power a fuel cell within a vehicle, said method comprising:

providing a first conduit system for transferring said pressurized gas to the fuel cell;

providing an expander;

operatively disposing said expander within said first conduit system;

providing a motor/generator for producing electrical power from torque and for producing torque from electrical power;

providing a second conduit system for transferring air to the fuel cell;

providing a compressor;

operatively disposing said compressor within said second conduit system;

operatively connecting said expander and said compressor to said motor/generator;

selectively connecting said expander and said compressor; and channeling said pressurized gas through said expander so as to rotatably drive said expander, thereby selectively driving said compressor and selectively causing said motor/generator to produce electrical power.

15. The method according to claim 14, further comprising:

measuring a vehicle operating attribute;

selectively causing the pressurized gas to bypass said expander based upon said measured vehicle operating attribute.

16. The method according to claim 15, further comprising:

providing a source of electrical power; and connecting said source of electrical power to said motor/generator when the pressurized gas bypasses said expander, thereby causing said motor/generator to produce torque and rotatably driving said compressor.

17. The method according to claim 16, further comprising the step of disconnecting said compressor from said expander when said pressurized gas bypasses said expander.

18. The method according to claim 16, wherein said vehicle operating attribute comprises a pressure of the pressurized gas in a certain location within said conduit system.

19. The method according to claim 16, wherein said source of electrical power comprises a battery.

20. The method according to claim 19, further comprising the step of delivering the produced electrical power to said battery effective to recharge said battery.

* * * * *